US006441694B1

(12) United States Patent
Turcotte et al.

(10) Patent No.: US 6,441,694 B1
(45) Date of Patent: Aug. 27, 2002

(54) METHOD AND APPARATUS FOR GENERATING DIGITALLY MODULATED SIGNALS

(75) Inventors: Randy L. Turcotte, Tempe; Stephen Chihhung Ma, Mesa; Matthew A. Ronning, Scottsdale; Keith V. Warble; Peter O. Okrah, both of Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/738,124

(22) Filed: Dec. 15, 2000

(51) Int. Cl.$^7$ ................................................. H03C 3/00
(52) U.S. Cl. ...................... 332/100; 332/144; 375/271; 375/295; 375/298; 455/255; 455/258; 455/118; 708/313
(58) Field of Search ................................... 332/100, 144; 455/255, 258, 118; 708/313; 375/376, 271, 295, 298; 370/215

Primary Examiner—Arnold Kinkead
(74) Attorney, Agent, or Firm—Ingrassia Fisher & Lorenz; Frank J. Bogacz

(57) ABSTRACT

A method and apparatus for generating digitally modulated signals in which a serial data stream of digital signals to be modulated (70) is provided, the serial data stream being converted into real and imaginary components (74) which are then converted into a complex polar signal (80) representing the serial data stream. A carrier of appropriate frequency is generated by an infinite impulse response filter (84,86) and the polar signal is mixed with the output of the infinite impulse response filter to provide a representation of the complex polar signal modulated at the frequency generated by the infinite impulse response filter (88). Subsequently the imaginary component of the resulting representation is stripped from the signal (90) and the real component of the resulting representation is applied to a digital to analog converter (92) to produce an analog version of the serial data stream.

12 Claims, 2 Drawing Sheets

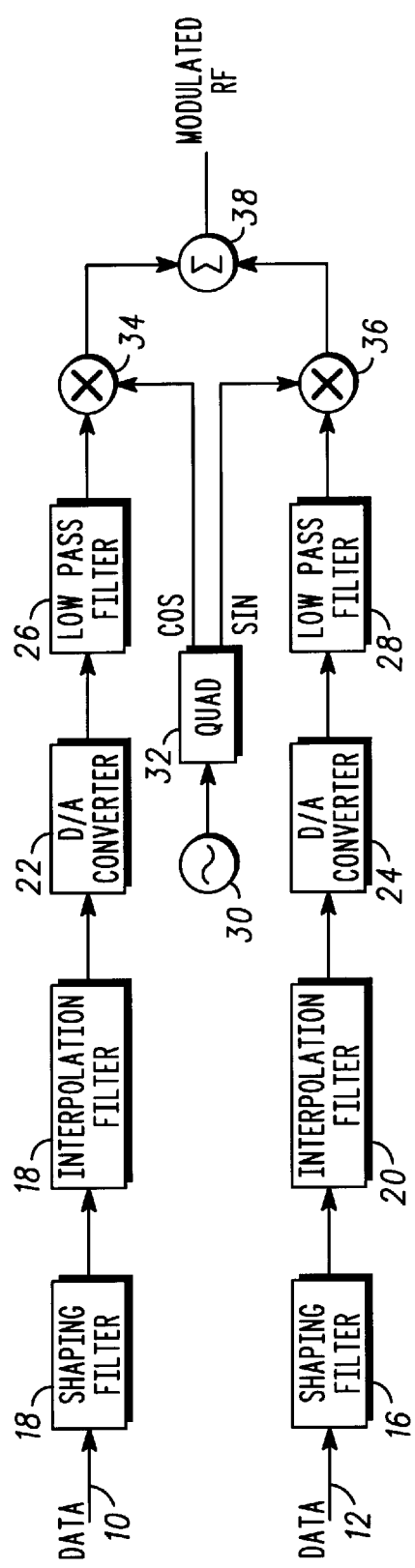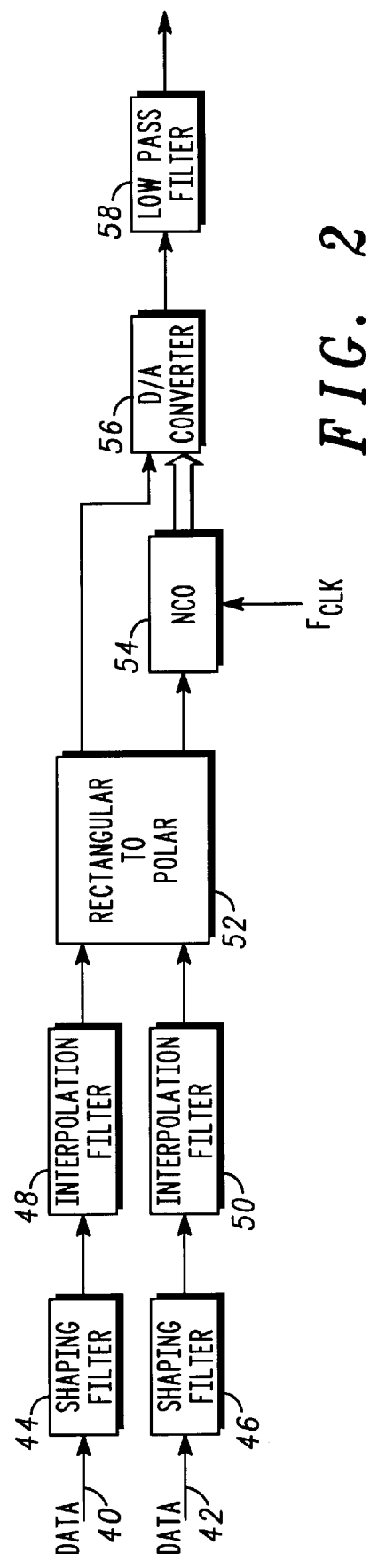

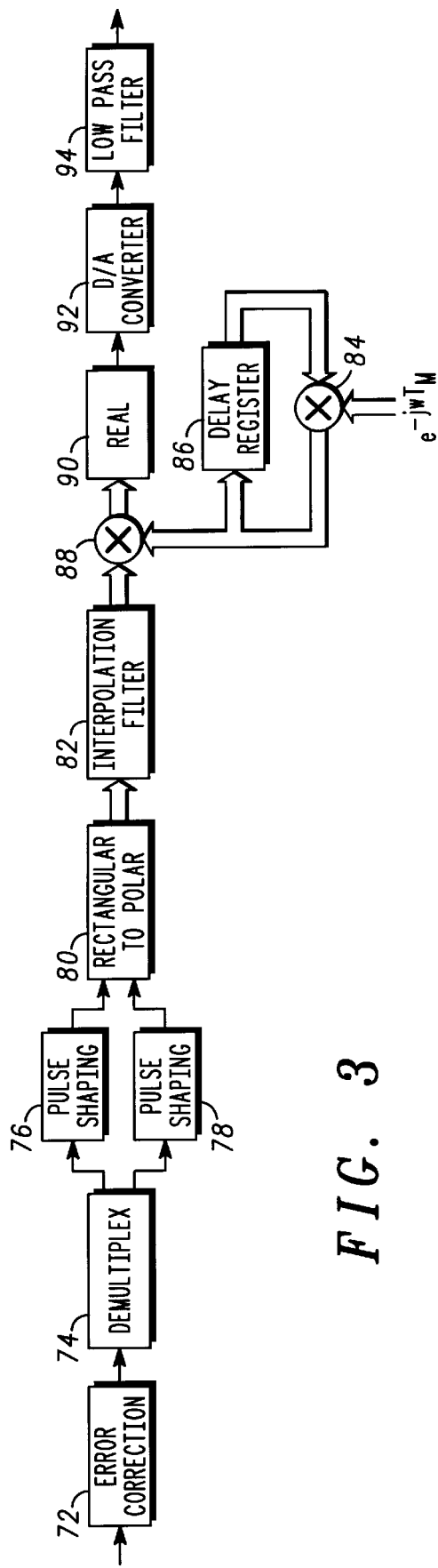
FIG. 3
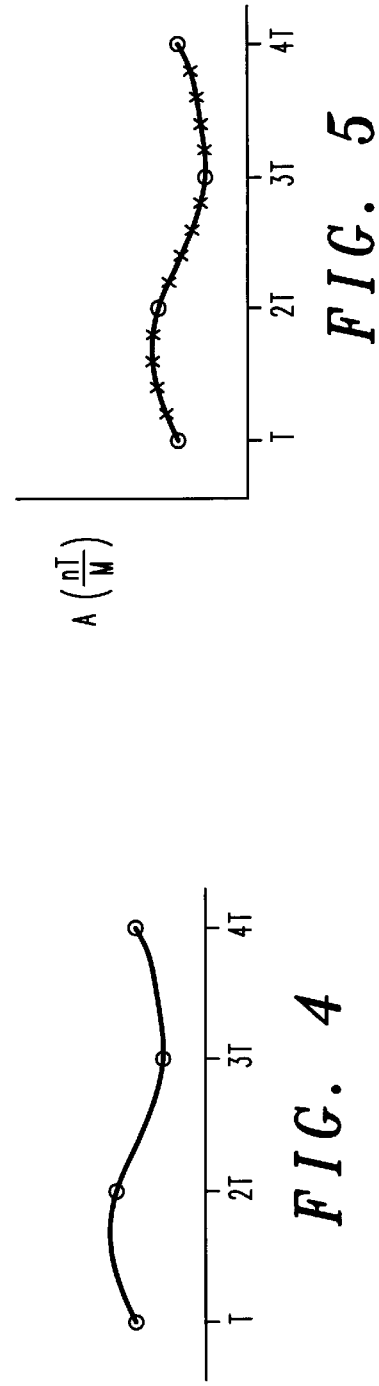
FIG. 5
FIG. 4

METHOD AND APPARATUS FOR GENERATING DIGITALLY MODULATED SIGNALS

FIELD OF THE INVENTION

This invention relates to digital modulators, and, more particularly to digital modulators in which the modulation of a digital signal onto a carrier occurs entirely in the digital domain.

BACKGROUND OF THE INVENTION

Digital modulators are employed when it is desired to transform a digital data stream into an analog signal modulated onto a carrier or intermediate frequency signal. Digital modulators are used, for example, in cable modems, television set top boxes, Microwave Multipoint Distribution Systems, Local Multipoint Distribution Systems, Orthogonal Frequency Division Multiplexing, and Vector Orthogonal Frequency Division Multiplexing.

In a classical implementation of a digital modulator, a pair of digital data streams, perhaps derived from a single data stream, are converted into analog signals and mixed as analog signals with the outputs of a quadrature oscillator to produce in-phase and quadrature-phase signals imposed on a carrier at the frequency determined by the oscillator.

Other more recent digital modulators, known as direct digital synthesis (DDS) modulators, have provided similar digital data streams (which may be designated as the real and imaginary components of an original data stream) which are modulated onto a carrier signal entirely within the digital domain. This allows processing of the signal substantially entirely within one integrated circuit. Once the digitally modulated carrier is produced, it is converted to an analog modulated carrier by a digital to analog converter.

This latter technique has several advantages, including the introduction of less distortion due to filter dissimilarities in the in-phase and quadrature-phase analog paths, better gain balance, and better phase balance.

The oscillator of a DDS, however may introduce spurious signals and noise into the system, thereby reducing the effectiveness of the circuit. It would be desirable to retain the advantages of direct digital synthesis while at the same time reducing the spurious content of the oscillator.

SUMMARY OF THE INVENTION

The above and other advantages of the present invention are attained by providing a method and apparatus for generating digitally modulated signals in which a serial data stream of digital signals to be modulated is provided, the serial data stream being converted into real and imaginary components which are then converted into a complex polar signal representing the serial data stream. A carrier of appropriate frequency is generated by an infinite impulse response filter and the polar signal is mixed with the output of the infinite impulse response filter to provide a representation of the complex polar signal modulated at the frequency generated by the infinite impulse response filter. Subsequently the imaginary component of the resulting representation is stripped from the signal and the real component of the resulting representation is applied to a digital to analog converter to produce an analog version of the serial data stream.

BRIEF DESCRIPTION OF THE DRAWINGS

FIG. 1 is a representation of a classical implementation of a digital modulator.

FIG. 2 is a representation of a direct digital synthesis modulator.

FIG. 3 is a block diagram of a digital modulator according to the present invention.

FIG. 4 is a chart showing the input signal to the interpolator of the invention.

FIG. 5 is a chart showing the output of the interpolator of the invention.

DESCRIPTION OF A PREFERRED EMBODIMENT

The classical implementation of a digital modulator is shown in FIG. 1A discrete-time data signal is processed using digital signal processing techniques. A single digital data stream may be demultiplexed into two data streams 10 and 12. The data streams 10 and 12 are usually processed, for example by pulse shaping filters 14 and 16. The filtered signals are applied to interpolation filters 18 and 20 that serve the purpose of inserting, through interpolation, additional data points in each of the data streams. The outputs of the interpolation filters are applied to digital-to-analog converters 22 and 24, the outputs of which are smoothed by low pass filters 26 and 28.

An oscillator 30 produces a carrier at a desired frequency that is applied to a quadrature phase shifter to produce the sin and cos components of the carrier. The sin and cos signals are mixed with the analog data streams in mixers 34 and 36 to produce in-phase and quadrature-phase signals which are summed by summer 38 to produce a carrier which is modulated by analog signals which are representations of the original data stream.

In the representation of FIG. 1, elements 10–20 are digital elements and elements 22–38 are analog elements.

This modulation scheme has the disadvantage of being primarily analog and thus subject to distortion as a result of the difficulty of precisely matching analog filters and failing to take advantage of the simpler semiconductor processing techniques available in largely digital systems.

FIG. 2 is a representation of a more recent digital modulator design, known as a direct digital synthesis (DDS) modulator. The modulator has provided two similar digital data streams 40 and 42 (which may be designated as the real and imaginary components of a single original data stream derived as in the modulator of FIG. 1), but which are modulated onto a carrier signal entirely within the digital domain. This allows processing of the signal substantially entirely within one integrated circuit.

The data streams 40 and 42 are applied to pulse shaping filters 44 and 46, the outputs of which are applied to interpolations filters 48 and 50.

The outputs of the interpolation filters 48 and 50 are applied to Rectangular to Polar conversion element 52 in order to create the amplitude and phase components of the baseband modulated signal. The phase modulation component is applied to the Numerically Controlled Oscillator (NCO) 54, thereby creating the phase modulation of the NCO created IF. The amplitude modulation component is applied directly to the Digital to Analog Converter 56 in order to create the amplitude modulation of the IF. The output of the DAC 56 is smoothed by the Low Pass Filter 58.

In this representation all the elements of the modulator are digital except for the Digital to Analog Converter 56 and the Low Pass Filter 58.

This latter technique has several advantages, including the introduction of less distortion due to filter dissimilarities in the in-phase and quadrature-phase analog paths, better gain balance, and better phase balance.

The oscillator of a DDS, however may introduce spurious signals and noise into the system, thereby reducing the effectiveness of the circuit. It would be desirable to retain the advantages of direct digital synthesis while at the same time reducing the spurious content of the oscillator.

FIG. 3 is a block diagram of a digital modulator according to the present invention. A digital data stream is generated by a source 70 which may be the output of a vocoder, for example, or simply a digital data stream from the output of a computer. The digital data stream optionally may be subjected to error correction such as forward error correction apparatus 72.

The encoded data stream is then demultiplexed by demultiplexer 74 which creates two digital data streams designated as the real and imaginary portions of the digital data stream. The demultiplexer 74 may operate simply by taking every second digital signal to be designated as the real component and the others as the imaginary portion of the data stream to create a series of complex digital numbers.

The real and imaginary portions of the data stream may be optionally applied to pulse shapers 76 and 78 respectively. The pulse shapers, if employed, shape the digital pulses to change their spectrum. For example an unshaped signal may constitute a pulse with fairly sharp rising and falling edges. The output pulses from the pulse shapers would typically have much more rounded edges. The shaped pulses therefore would require less spectrum than the sharper pulses.

The real and imaginary outputs of the pulse shapers 76 and 78, respectively, are converted into a series of complex numbers expressed in polar coordinates by rectangular to polar converter 80. If the pulse stream of the real portion of the rectangular waveform is a(t) and the imaginary portion is b(t), then the complex number at the input of converter 80 is a(t)+jb(t). The converter 80 merely solves the equations: $A(t)=\sqrt{a^2(t)+b^2(t)}$ and $\theta(t)=\tan^{-1}\{b(t)/a(t)\}$.

In a normal implementation, the clock rate necessary for the generation of the IF and modulated signal must be considerably higher than the clock rate necessary to process the data. Because of this the pulse shaping filters 76, 78, the interpolation filter 82, and the rectangular to polar converter 80 will operate at a slower sample clock than the clock used to process the data to be modulated. The respective clocks are $F_{clkd}<F_{clkm}$, where $F_{clkd}$ is the clock used in processing the data and $F_{clkm}$ is the clock used to actually modulate the polar data onto the digital IF.

The outputs of the rectangular to polar converter 80 are thus applied to an interpolator where the additional numerical points are added to the points of the digital data streams to provide a smoother representation of the data stream and to match to higher clock rate of the digital IF. For example, FIG. 4 shows a series of points on a graph representing the numbers generated at the output of the rectangular to polar 80. FIG. 5 is a representation of the same series of numbers after having been interpolated by a factor of four to one (four to one is an exemplary ratio only; the actual interpolation rate will be determined by the ratio of $F_{clkd}$ to $F_{clkm}$).

An infinite impulse response filter IIR 84 and 86 in FIG. 3 is used to produce a carrier signal at an appropriate IF frequency $f_{IF}$. At the clock rate $1/T_M$, a phasor, $\exp\{-j2\pi f_0 T_M\}$ is applied to a multiplier 84. The output of multiplier 84 is applied to complex multiplier 88 where it is mixed with the output of the interpolation filter 82. The output signal of multiplier 84 is also applied to a delay register 86, the output of which is fed back, delayed, to the multiplier 84 where the delayed value from delay register 86 is mixed with the input carrier phasor, $\exp\{-j2\pi f_0 T_M\}$. The infinite impulse response filter operates in accordance with the following equation:

$$Y(nT_M)=\delta(nT_M)+\exp\{-j2\pi f_0 T_M\}y[(n-1)T_M]$$

The impulse $\delta$ initializes the IIR oscillator and the oscillation is sustained by feedback. Thus a one is stored in the delay register 86 for the first cycle. So $\delta=1$ and $y[(n-1)T_M]=0$ resulting in a first output of 1. On the next cycle, $\delta$ becomes 0 ($\delta(n)=0$). For subsequent groups, $\exp\{-j2\pi f_0 T_M\}$ controls the frequency, $f_{IF}=f_0 \cdot T_M$.

The modulation in the complex multiplier 88 takes place in the digital domain. The output is a complex modulated signal:

$$Z(nT_M)=M(nT_M)e_{j\phi}(nT_M)e^{-j2\pi f_{IF}T_M}$$

Rewriting this equation in terms of real and imaginary components:

$$Z(nT_M)=M(nT_M)\cos[n2\pi f_{IF}T_M+\phi(nT_M)]-j\sin[n2\pi f_{IF}T_M+\phi(nT_M)]$$

It can be seen that the digital version of the desired signal after modulation is the real part of $Z(nT_m)$, or $$Re\{z(nT_M)\}=M(nT_M)\cos[n2\pi f_{IF}T_M+\phi(nT_M)]$$

This signal is produced by the apparatus 90, which simply takes the real part of the complex signal and drives the digital to analog converter DAC 92 whose output becomes the analog version of the desired modulated signal. The output of DAC 92 is further processed by a low pass filter to smooth the signal and eliminate some of the clock noise.

Thus has been provided a digital modulator with substantially wholly digital processing of a digital data stream which uses an infinite impulse response filter to generate the carrier frequency onto which the digital data stream is to be modulated.

Although the preferred embodiment of the invention has been illustrated, and that form described in detail, it will be readily apparent to those skilled in the art that various modifications may be made without departing form the spirit of the invention or from the scope of the appended claims.

What is claimed is:

1. A method for generating digitally modulated signals comprising:

providing a serial data stream of digital signals to be modulated;

converting the serial data stream into real and imaginary components;

converting the real and imaginary components into a complex polar signal representing the serial data stream;

providing an infinite impulse response filter for generating an output carrier at a desired frequency;

mixing the complex polar signal with the output carrier of the infinite impulse response filter to provide a representation of the complex polar signal modulated at the desired frequency generated by the infinite impulse response filter; and extracting the real component of the resulting representation to provide a digitally modulated representation of the serial data stream.

2. A method as set forth in claim 1 wherein the conversion of the serial data stream into a complex polar signal is performed at a clock rate lower than a dock rate of the infinite impulse response filter.

3. A method as set forth in claim 2 further comprising interpolating the complex polar signal to a rate corresponding to a clock rate of the infinite impulse response filter.

4. A method as set forth in claim 1 comprising applying the digitally modulated representation of the serial data stream to a digital to analog converter to produce an analog version of the serial data stream.

5. A method as set forth in claim 3 comprising applying the digitally modulated representation of the serial data stream to a digital to analog converter to produce an analog version of the serial data stream.

6. A digital modulator comprising:

a processor for receiving a serial data stream of digital signals to be modulated and for separating the serial data stream to into real and imaginary components;

a rectangular to polar converter for receiving the real and imaginary components to produce a complex polar signal representing the serial data stream;

a complex multiplier;

an infinite impulse response filter for producing a carrier signal at a desired frequency;

applying the complex polar signal and the carrier signal of the infinite impulse response filter to the complex multiplier to produce a modulated complex signal representative of the serial data stream of digital signals at a frequency of the carrier signal generated by the infinite impulse response filter; and means for extracting the real component of the modulated complex signal to produce a resultant digital signal representative of the serial data stream of digital signals.

7. A digital modulator as set forth in claim 6 wherein the serial data stream is converted into the complex polar signal at a clock rate lower than a clock rate of the infinite impulse response filter.

8. A digital modulator as set forth in claim 7 further comprising an interpolator for interpolating the complex polar signal to a rate corresponding to a clock rate of the infinite impulse response filter.

9. A digital modulator as set forth in claim 6 further comprising a digital to analog converter for accepting the resultant digital signal and for producing an analog output signal representative of the serial data stream of digital signals.

10. A digital modulator as set forth in claim 8 further comprising a digital to analog converter for accepting the modulated complex signal and for producing an analog output signal representative of the serial data stream of digital signals.

11. A digital modulator comprising:

a rectangular to polar converter for receiving real and imaginary components of a digital data stream to produce a complex polar signal representing the digital data stream;

a complex multiplier;

an infinite impulse response filter having an input representative of a frequency of a desired carrier signal, and comprising a multiplier, and a delay register in feedback to the multiplier to produce at an output a carrier frequency signal of a desired frequency;

applying the complex polar signal and the output of the infinite impulse response filter to the complex multiplier to produce a modulated complex signal representative of the digital data stream at the desired frequency of the carrier frequency signal generated by the infinite impulse response filter, the modulated complex signal having real and imaginary parts;

means for extracting the real part of the modulated complex signal to produce a resultant digital signal representative of the digital data stream; and, a digital to analog converter having an input for receiving the resultant digital signal, and an output for producing an analog signal representing the digital data stream modulated at the desired carrier frequency.

12. A digital modulator as set forth in claim 11 further comprising a demultiplexer for receiving a serial data stream of digital signals to be modulated and for separating the serial data stream to into real and imaginary components of a digital data stream.

* * * * *